UNITED STATES PATENT OFFICE.

PETER COOPER HEWITT, OF NEW YORK, N. Y.

PROCESS OF PURIFYING GLUE.

SPECIFICATION forming part of Letters Patent No. 522,831, dated July 10, 1894.

Application filed February 5, 1894. Serial No. 499,186. (No specimens.)

*To all whom it may concern:*

Be it known that I, PETER COOPER HEWITT, of New York city, in the county and State of New York, have invented a new and Improved Process of Removing Impurities from Glue, of which the following is a full and clear description.

The object of my invention is to provide a simple, inexpensive and effective method for removing impurities from glue, which will permit of easily removing the purifying agent together with the impurities from the glue, and which will remove ordor and color, and will impart to the glue qualities heretofore attained with difficulty.

In carrying out my invention, I prefer to use casein derived from skimmed milk as it comes from dairies. In the manufacture of butter, after the fatty bodies are removed from the milk, the casein in the skimmed milk makes a cheese of inferior quality. This cheese or casein I prefer to use, but it is not essential that it should be free from oil. The casein is separated from the milk by heating the milk, then touching it with rennet. The milk thus coagulated is allowed to stand until the whey is separated, when the whey is poured off. The casein after washing, is dissolved in water rendered alkaline preferably by the addition of lime. I may require lime in the proportion of about ten per cent. of the dry weight of the casein; this proportion varies with the age of the casein and the manner of manufacture, but it is usually less. This solution of casein, either without modification, or modified when necessary as explained below, is added to the glue solution and unites with the impurities therein, separating them from the glue and rendering the glue clear by removing from the glue solution grease and other impurities, and also removing color and odor, at the same time imparting to the glue, among other desirable qualities, great limpidity and freedom from foaming. The separation of the casein and impurities from the glue may be hastened by heat, also by a change in acidity or by the use of rennet.

The modifications of the casein which may in some cases be advisable, are as follows: For the treatment of some glue solutions it is advisable to add to the casein solution, albumen (preferably albumen derived from blood) in proportions varying from five to fifty per cent. of the dry weight of the casein. The necessity for this addition of albumen arises from a deficiency of albumen substance in the casein or glue solution. The quantity necessary can be most conveniently determined for each quality of casein and glue by a preliminary test, or the original casein solution may be added to the glue solution first, and if the desired effect is not secured, the diluted albumen may then be introduced into the mixture by successive additions, until the desired result is secured. This amount once determined in either way will serve to guide all operations where the quality of casein and glue remains the same. For some uses it is desirable that the casein should not be alkaline, but neutral or even acid. In such cases the alkaline casein solution may be neutralized and acidulated with a suitable acid, preferably phosphoric acid.

If casein is first brought into acid solution, the coagulation can be effected by a change in the acidity of the solution, on the addition of an excess of acid, or preferably by bringing it to a neutral state or an alkaline state.

The clarifying agent may be evaporated and put in packages for preservation and for storage for future use. For this purpose, either the original casein solution, or a casein solution to which albumen has been added may be evaporated. When the clarifying agent thus prepared is to be used, a suitable quantity of water is added to reduce it to the required strength.

In the manufacture of glue when the stock is rendered by heating, the gelatine going into solution carries with it other constituents of the stock. These are now removed with great difficulty, by large filters and the use of clarifying agents such as albumen and alum. These all have decided objections well known to glue makers, albumen being expensive and leaving the glue foamy, besides causing the glue to filter very slowly through the coagulum, and alum being uncertain, besides leaving acid or its salts in the glue, injuring the quality, and the agent and the impurities are separated with very great difficulty after the operation is completed by filtration, as in this case also the precipitate clogs the filter.

To apply the clarifying agent to the purification of glue, I mix it with the glue in solution as it comes from the boiler, in about the proportion of one pound of the agent (dry weight) to one thousand pounds of the glue solution, the dry glue being about ten per cent. of the solution. I thoroughly mix the agent and the glue, and the agent uniting with the impurities coagulates, the process of coagulation being hastened and aided by heat, by change of acidity or by the use of rennet as already stated. The coagulum separates when formed. The applied heat hardens the precipitate and coagulum. To remove this coagulum, I use any of the well known means, such as settling, or filtration, or centrifugal force, as there is no difficulty in removing it. Should the combination of the phosphoric acid with the lime produce insoluble lime phosphate, this is removed in the coagulum. In the case of a filter being used, the precipitate does not clog the filter, as it is of such a nature that it keeps itself separated, allowing the liquid to pass freely through it. In cases where alumina is added to the glue or formed in the glue from the sulphate of alumina my improved agent and process will readily remove it, carrying it out in the coagulum with the other impurities.

Casein yields a precipitate of firm structure which offers but little impediment to the filtration of the glue solution through it, and should coagulated albumen or alumina be present during the coagulation, the resulting precipitate becomes harder, offering less resistance to filtration than the albumen or alumina, and resembles the casein precipitate.

After clarifying the glue in the manner described, it may be treated by the usual methods. If desirable, it may be bleached either before or after clarification. This agent is particularly adapted for removing color from glue, in connection with other bleaching agents.

The by-product of the process, which consists of the coagulum and the impurities of the glue, is used as a fertilizer. This by-product may be disposed of in the state in which it is removed from the glue, or it may be dried, to render it more fixed and portable.

By the word "hardener" as used herein, I mean an agent which renders the precipitate more easy of removal from the liquid, by imparting to the precipitate a firmer nature.

By the term alumina, as herein used, I mean precipitated gelatinous alumina.

By the term "casein" as used herein, I mean any form of casein, whether of animal or vegetable origin.

Having thus described my invention, I claim as new and desire to secure by Letters Patent—

1. The improved method of clarifying glue, which consists in adding to and thoroughly mixing casein in solution with the glue solution, causing the casein to unite with albuminous substances and other impurities in the glue and become insoluble, thereby separating such impurities from the glue, and finally removing the resulting coagulum from the glue solution.

2. The method of clarifying glue, which consists in adding to and mixing with the glue solution, casein and albumen in solution, heating the mixture, causing the solution of casein and albumen to unite with the impurities in the glue solution, thus forming an insoluble compound, and thereby separating the mixture of casein and albumen together with the impurities from the glue, and finally removing the same from the glue solution, as herein specified.

3. The method of hardening albumen coagulum, which consists in adding casein to the solution containing albumen, then coagulating the mixture, as specified.

4. The method of removing alumina from glue in solution, which consists in adding to the glue in solution containing the alumina, a solution of casein coagulable in the glue in solution, then coagulating the same, forming a coagulum of casein and alumina and separating the coagulum from the liquid, as specified.

5. The method of preparing a casein albumen clarifying agent, which consists in dissolving cheese in an alkaline water, then adding blood albumen in solution, as specified.

PETER COOPER HEWITT.

Witnesses:
C. SEDGWICK,
F. W. HANAFORD.